United States Patent [19]

Hayashi

[11] 4,423,667

[45] Jan. 3, 1984

[54] BEARING

[75] Inventor: Yoshimasa Hayashi, Kamakura, Japan

[73] Assignee: Nissan Motor Co., Ltd., Yokohama, Japan

[21] Appl. No.: 146,930

[22] Filed: May 5, 1980

[30] Foreign Application Priority Data

May 9, 1979 [JP] Japan .................................. 54-61489

[51] Int. Cl.³ ............................ F02F 7/00; F01B 1/00
[52] U.S. Cl. ....................................... 92/261; 92/147; 384/433
[58] Field of Search .................. 92/DIG. 1, 261, 147, 92/161; 308/23, 23.5, 179, 26

[56] References Cited

U.S. PATENT DOCUMENTS

| | | | |
|---|---|---|---|
| 2,057,507 | 10/1936 | Weidenbocker | 308/26 |
| 2,880,027 | 3/1959 | Everitt et al. | 308/26 |
| 3,304,134 | 2/1967 | Allen | 308/23 |

FOREIGN PATENT DOCUMENTS

| | | | |
|---|---|---|---|
| 1299038 | 6/1962 | France | 308/23 |
| 52-136818 | 11/1977 | Japan . | |
| 511726 | 8/1939 | United Kingdom . | |
| 1101995 | 2/1968 | United Kingdom . | |
| 1214657 | 12/1970 | United Kingdom . | |
| 1217835 | 12/1970 | United Kingdom . | |
| 1289303 | 9/1972 | United Kingdom . | |
| 1365354 | 9/1974 | United Kingdom . | |
| 1383645 | 2/1975 | United Kingdom . | |
| 1411323 | 10/1975 | United Kingdom . | |
| 1495736 | 12/1977 | United Kingdom . | |
| 1577562 | 10/1980 | United Kingdom . | |

*Primary Examiner*—Paul E. Maslousky
*Attorney, Agent, or Firm*—Thompson, Birch, Gauthier & Samuels

[57] ABSTRACT

A sleeve-type bearing includes an outer sleeve, an inner sleeve, and an oscillation-damping material fixedly disposed between the outer and inner sleeves. It is preferable that such a bearing is used to support a crankshaft of an automotive engine.

5 Claims, 8 Drawing Figures

BEARING

BACKGROUND OF THE INVENTION

The present invention relates to a sleeve-type or plain bearing which can be applied to an automotive engine.

FIG. 1 illustrates a prior art automotive engine in which either a prior art bearing or the bearing of the present invention can be employed. A cylinder block 1 is equipped with a bearing cap 2 for supporting a crankshaft 5 having a plurality of journals. Each journal of the crankshaft 5 fits. Each journal 5a fits within a bearing 4 which is mounted in an opening 3 in a metal housing formed by the cylinder block 1 and the bearing cap 2. The inner wall of the bearing 4 is covered with oil.

When a piston (not shown) moves down on the power stroke, it imparts considerable force to a connecting rod (not shown). This force tends to twist the crankshaft 5. When the end of the power stroke is reached, the push against the crankshaft 5 is relieved, so that the crankshaft 5 attempts to return to its original shape but actually overrides this position. This sets up an oscillation motion within the crankshaft 5, which is repeated with every power stroke. In a prior art bearing as shown in FIG. 2, the oscillation of the crankshaft 5 is transmitted through the bearing 4 to the bearing cap 2 and the cylinder block 1 thereby to vibrate other engine components such as an oil pan. This results in engine noise.

SUMMARY OF THE INVENTION

The object of the present invention is to provide an improved sleeve-type or plain bearing which can reasonably absorb an oscillation transmitted from, for example, a crankshaft of an automotive engine.

According to the present invention, a bearing comprises an inner sleeve, an outer sleeve and a vibration-damping material fixedly disposed between the inner and outer sleeves. In a preferred embodiment of the present invention, such a bearing is arranged to support a crankshaft of the automotive engine.

DETAILED DESCRIPTION OF THE PREFERRED EMBODIMENTS

Figure 1:
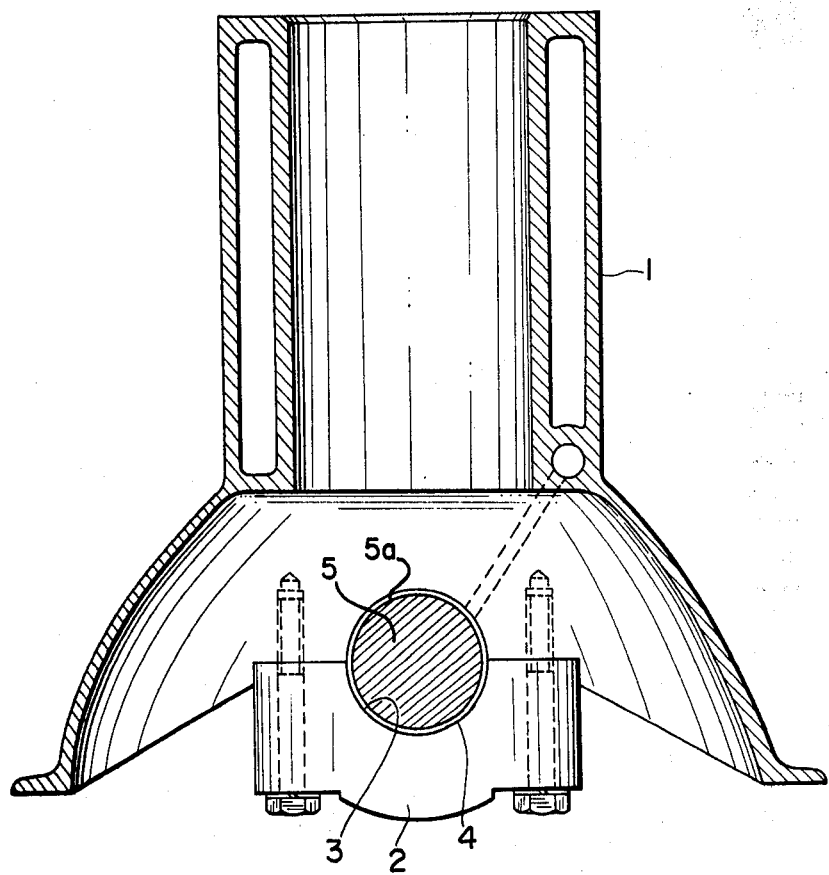
FIG. 1 is a vertical section illustrating an automotive engine equipped with a bearing cap.
Figure 2:
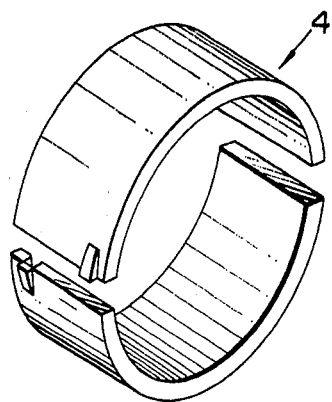
FIG. 2 is a perspective view showing a half of a conventional sleeve-type or plain bearing.
Figure 3:
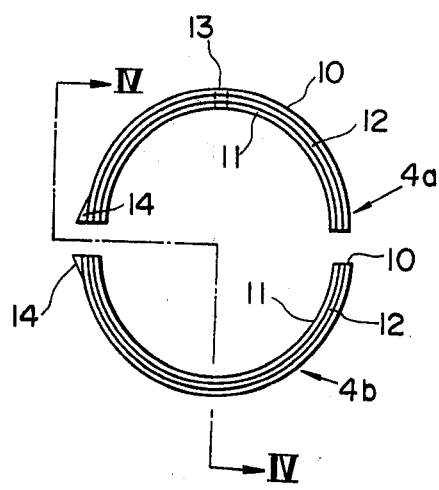
FIG. 3 is a schematic front view showing a sleeve-type bearing according to a preferred embodiment of the present invention.
Figure 4:
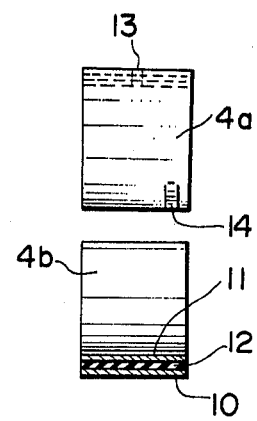
FIG. 4 is a sectional view taken along the line IV—IV in FIG. 3.
Figure 5:
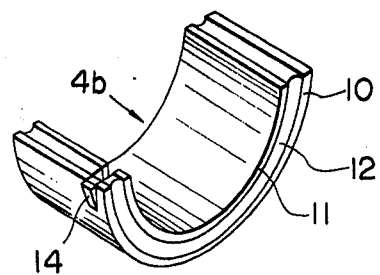
FIG. 5 is a perspective view showing the lower half of the bearing as shown in FIG. 3.

Referring now to FIGS. 3 through 5, a sleeve-type or plain bearing includes an outer sleeve 10 to be fixedly placed in a metal housing formed by a cylinder block of an automotive engine and a bearing cap attached thereto, and an inner sleeve 11 to be slidably placed on a journal of a crankshaft. A vibration-damping material 12 is fixedly disposed between the outer and inner sleeves 10 and 11. For example, the vibration-damping material 12 is made of a resilient metal or sintered metal, or an organic material such as an oil-resisting hard rubber or denatured urethane. It is preferable that a material such as a white metal or the like is coated on the inner wall of the inner sleeve 11. Also, the vibration-damping material 12 is fixed onto both the inner and outer sleeves 10 and 11, for example, by shrink fit or adhesion. An oil passage 13 passes through the inner and outer sleeves 10, 11 and the vibration-damping material 12. A locking portion 14 protrudes outwardly from the outer sleeve 10.

In the embodiment shown in FIGS. 3 through 5, the bearing consists of two halves 4a and 4b. The locking portion 14 is positioned at the left end of each of the two halves 4a and 4b in FIG. 3. The locking portions 14 of the sleeves 10, 11 are to be engaged with a recessed portion (not shown) of the metal housing so as to prevent the sleeves 10, 11 from displacing within the metal housing.

Figure 6:
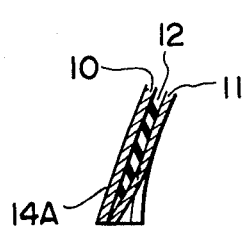
FIG. 6 is an enlarged sectional view of part of the bearing as shown in FIG. 3.

FIG. 6 illustrates a preferred form of the locking portion 14. The outer and inner sleeves 10, 11 are raised so as to protrude outwardly to constitute a pawl-like locking portion 14A.

Figure 7:
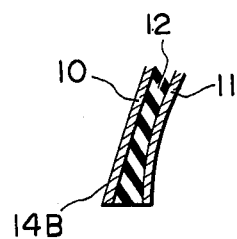
FIG. 7 is a sectional view showing a modified form of part of the bearing corresponding to FIG. 6.

FIG. 7 shows a further preferred form of the locking portion 14. Only the outer sleeve 10 is raised so as to diverge outwardly with respect to the inner sleeve 11, thereby forming a pawl-like locking member 14B having an increased thickness at its tip as compared with that of the remainder of the bearing half-section.

Figure 8:
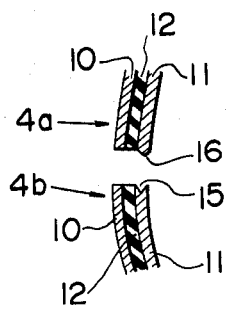
FIG. 8 is a sectional view showing a portion of connecting two halves of a sleeve-type bearing according to another preferred embodiment of the present invention.

As FIG. 8 illustrates, a positioning mechanism can be formed at the abutment ends of the upper and lower halves 4a and 4b of the bearing. For example, a projection 16 is formed on an end of the inner sleeve 11 of the upper half 4a while a recessed portion 15 is formed in the corresponding end of the inner sleeve 11 of the lower half 4b. When the projection 16 is properly engaged with the recessed portion 15, the upper and lower halves 4a and 4b can be precisely positioned to each other within the metal housing.

According to the above-mentioned bearing, the oscillation of the crankshaft transmitted through the connection rod from the piston can be effectively damped or absorbed by not only the oil coating between the journal of the crankshaft and the bearing, but also the vibration-damping material 12 disposed between the inner and outer sleeves 10, 11, so that the cylinder block and other engine components can be reasonably prevented from oscillation. Thus, the engine noise due to the crankshaft oscillation can be remarkably decreased.

In addition, as the vibration-damping material 12 is resiliently deformed, then the material 12 functions to adjust each axis of the bearings in the respective metal housings in relation to the crankshaft even if they are not precisely aligned.

My experiment shows that the oscillation acceleration around 1 $KH_z$ to be solved as an engine noise problem is approximately 1 G and the displacement of such an oscillation is within 0.25 μm. The thickness of the oscillation-damping material 12 enough to effectively damp or absorb such an displacement is approximately 0.5 to 2 mm. It is preferable, also, that the thickness of the oil coating is about D/1000 where D is the diameter of the crankshaft.

The present invention may be practiced or embodied in other ways without departing from the spirit thereof. For example, while in the illustrated embodiments, a bearing is arranged in the metal housing formed by the cylinder block and the bearing cap, the bearing can be placed in a metal housing formed at the lower end of the connecting rod. Also, the bearing may be applied between any other members. Additionally, the oscillation-damping material can be divided into a plurality of parts or layers. The preferred embodiments described herein are therefore illustrative and not restrictive, the scope of the present invention being indicated by the appended claims and all variations which come within the meaning of the claims are intended to be embraced therein.

What is claimed is:

1. In an automotive engine having a cylinder block cooperating with a bearing cap to define a metal housing through which extends a crankshaft, the improvement comprising a sleeve-type bearing consisting of mating semi-cylindrical half-sections interposed between said crankshaft and said housing, said bearing having an inner sleeve rotatably supporting said crankshaft, an outer sleeve supported by said housing, means fixedly interposed between said inner and outer sleeves for damping the oscillation of said crankshaft and a locking portion integrally formed on at least said outer sleeve, said locking portion protruding radially outwardly from the exterior cylindrical surface of said outer sleeve and being adapted to be received in mechanical engagement with said housing to fixedly locate said bearing in relation thereto.

2. The engine of claim 1 wherein said inner and outer sleeves are metallic, and wherein said means comprises a layer of resilient material.

3. In an automotive engine having a cylinder block cooperating with a bearing cap to define an opening through which extends a crankshaft, the improvement comprising a cylindrical bearing assembly interposed between said crankshaft and the wall of said opening, said bearing assembly consisting of mating semi-cylindrical half sections, each half section having a semi-cylindrical inner sleeve portion radially separated from a semi-cylindrical outer sleeve portion by an intermediate layer of vibration damping material, said inner sleeve portions being arranged to rotatably support said crankshaft and said outer sleeve portions cooperating in a mutually divergent manner with said inner sleeve portions to define radially outwardly protruding locking members, the tips of said locking members having an increased thickness as compared with that of the remainder of said semi-cylindrical half sections.

4. In an automotive engine having a cylinder block cooperating with a bearing cap to define a metal housing through which extends a crankshaft, a bearing assembly adapted to be interposed betwen said crankshaft and said metal housing, said bearing assembly consisting of mating semi-cylindrical half-sections forming an inner sleeve rotatably supporting a section of said crankshaft, an outer sleeve supported by said housing, and a material confined between said inner and outer sleeves for damping the oscillation of said crankshaft, said outer sleeve being formed with an outwardly protruding pawl-shaped locking portion adapted to be received in mechanical engagement with said housing, said inner and outer sleeves converging at the tip of said locking portion to gradually diminish the thickness thereof, with an accompanying reduction in the thickness of the material in said portion.

5. In an automotive engine having a cylinder block cooperating with a bearing cap to define a metal housing through which extends a crankshaft, a bearing assembly adapted to be interposed between said crankshaft and said metal housing, said bearing assembly consisting of mating semi-cylindrical half-sections forming an inner sleeve rotatably supporting a section of said crankshaft, an outer sleeve supported by said housing, and a material confined between said inner and outer sleeves for damping the oscillation of said crankshaft, said outer sleeve being formed with an outwardly protruding pawl-shaped locking portion adapted to be received in mechanical engagement with said housing, said inner and outer sleeves diverging at said locking portion to gradually increase the thickness of said locking portion, with an accompanying increase in the thickness of the material in said locking portion.

* * * * *